No. 699,428. Patented May 6, 1902.
L. B. TRUSLOW.
VEHICLE SEAT.
(Application filed Mar. 12, 1902.)
(No Model.)
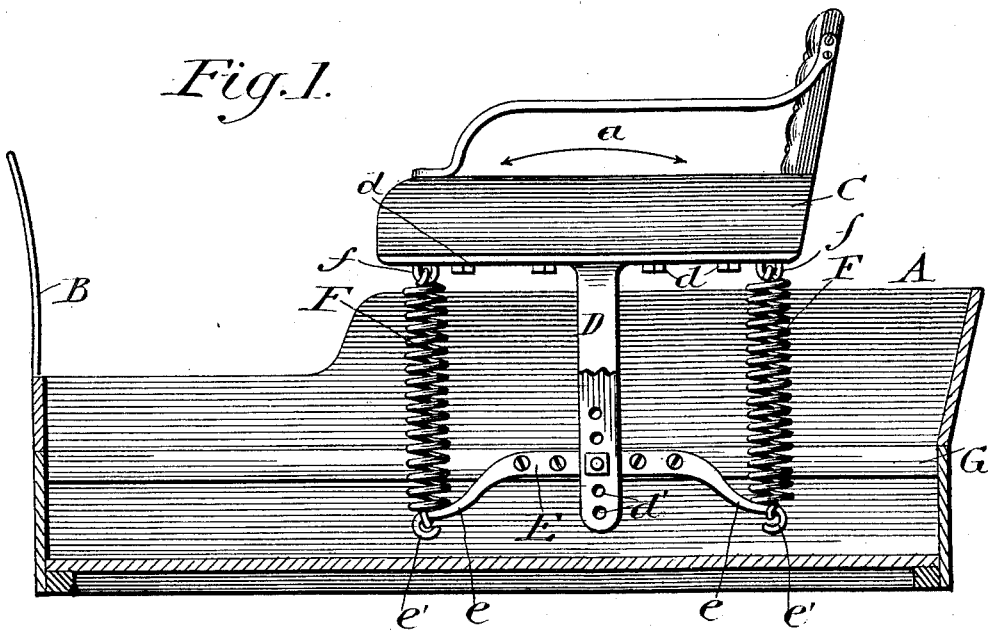
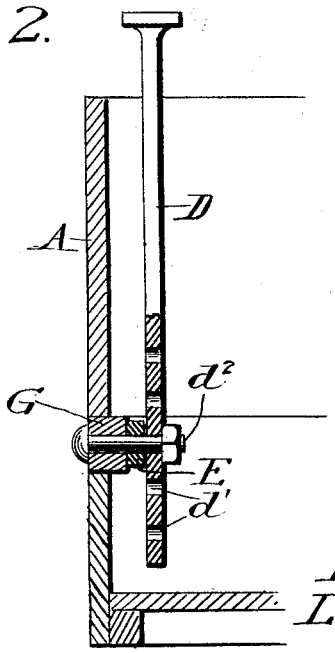
Witnesses:
D. W. Edelin.
A. Harveycutter.
Inventor.
Louis B. Truslow.
By Robt. P. Haines, Atty.

UNITED STATES PATENT OFFICE.

LOUIS B. TRUSLOW, OF THOMASTON, NEW YORK.

VEHICLE-SEAT.

SPECIFICATION forming part of Letters Patent No. 699,428, dated May 6, 1902.

Application filed March 12, 1902. Serial No. 97,334. (No model.)

*To all whom it may concern:*

Be it known that I, LOUIS B. TRUSLOW, a citizen of the United States, residing at Thomaston, in the county of Nassau and State of New York, have invented certain new and useful Improvements in Vehicle-Seats, of which the following is a specification.

The invention to be hereinafter described relates to vehicle-seats, and is more particularly applicable to such seats as are employed in two-wheeled vehicles, wherein the vibrations of the vehicle-body due to the horse motion are liable to be transmitted with their full effect to the seat secured to the said vehicle, although it is evident, of course, as will hereinafter appear, that my improved seat and its mechanical connections with the vehicle-body may be employed in any character of vehicle.

A seat which is rigidly secured to a vehicle-body or rests directly on bearings having unyielding connection with the vehicle-body the motion of the horse is usually transmitted, especially in two-wheeled vehicles, to such an extent as to subject the occupant of the seat to much inconvenience and annoyance. On the other hand, when the seat is supported upon the carriage-body directly by springs there is then liable to be too much oscillating vibration and unsteadiness of the seat due to the elasticity of the spring-supports. In the two-wheeled vehicles one of the principal annoying motions to which the seat is subjected is that due to the rocking of the carriage-body about the carriage support or axle, such motion being an alternately rising and falling motion of the front and rear of the vehicle-body, and consequently the seat, being usually supported between the front and back of the vehicle, will be subjected to a motion in the arc of a circle having the axle or carriage-support for its center—in other words, a forward and backward motion toward and from the horse.

It is the object of my present invention to provide a construction of vehicle-seat that will overcome this motion, which I will hereinafter term the "vibrating" motion, due to the action of the horse; and to this end my invention consists of a seat having fixedly secured thereto depending supporting-arms, which are pivoted to the vehicle-body at a point in the length of said supporting-arms remote from the seat, and springs or other yielding medium connecting the front and back of the seat on either side of the supporting-arms to a vehicle-body, the construction being such that the vibrating motion of the seat due to the horse action and the motion of the vehicle about its support or axle may be almost, if not entirely, overcome, as will hereinafter more fully appear and then be definitely pointed out in the claims.

In the drawings, Figure 1 shows in side elevation a vehicle-seat provided with my improved seat-supporting attachment, and Fig. 2 is a cross-section showing the supporting-arms and the manner of pivoting said supporting-arms to the vehicle-body.

In the drawings, A represents the body of any usual form of vehicle, B being the dash-board and C the seat, of any usual form. Secured to the bottom of the seat, as by bolts and nuts $d$, and at each end of the seat is a depending arm D, preferably perforated at several points near its lower end and some distance below the seat, as at $d'$, by which the said supporting-arms D are pivotally connected to the body-rail G of the vehicle by means of a bolt $d^2$, and I may also provide the depending arms D with a series of such holes $d'$, whereby the height of said seat may be adjusted as desired. By thus pivoting the seat to the vehicle-body by means of the depending supporting-arms D at points remote from the seat-body C it will be obvious that there may be imparted to the seat a bodily movement around the pivot $d^2$ as a center—as, for instance, backward and forward in the direction of the dotted line $a$, Fig. 1—and since the vibrations or reciprocating motions imparted by the carriage or vehicle body due to the horse action is a back-and-forward motion to the seat as hereinbefore stated, it will be obvious that if the bodily movement of the seat about the pivotal connection $d^2$ can be controlled in opposition to the like movement of the vehicle-body, that the seat may remain substantially stationary while the vehicle-body may vibrate as specified, and to secure this end I have provided the following means.

Preferably secured to the body-rail G inside of the vehicle are the spring-connecting devices E, preferably interposed between the depending supporting-arms D and the body-rail G, although, of course, it will be obvious that this construction in its details may be varied as desired, and projecting from the spring-connecting devices E are the downturned ends e, provided with hooks or bent extremities e', to which one end of springs F F may be connected, the opposite end of said springs being joined to the seat at points on opposite sides of the depending supporting-arms D, as at f. It will be noticed that the springs joining the front and back portions of the seat to the spring-connecting devices E are disposed on opposite sides of the pivotal point $d^2$ of the depending supporting-arms D, so that any bodily movement of the seat C in the arc of the circle a, Fig. 1, about the pivotal point $d^2$ will be controlled by the springs F, and by reason of the yielding character of these springs and the normal tendency of the seat through its inertia of rest to remain stationary the carriage-body will be permitted to vibrate or reciprocate, as hereinbefore set forth, while the seat will not partake of such motion of the carriage-body.

The action of the seat in my improved construction is quite distinct from that wherein the seat would be pivoted at a point close to its body portion and having spring connection with the carriage-body at opposite sides of its pivotal connection therewith, as in the case assumed, the pivot of the seat being closely disposed with respect to the seat-body and having the full weight of the vehicle-body the seat would be given the full forward-and-backward movement and the vehicle-body due to the horse action, whereas by providing the seat with long depending arms, as D, and connecting the said arms pivotally with the carriage-body at a point remote from the seat it will be obvious that while the pivot $d^2$ may have the full vehicle motion, yet the seat by its inertia of rest will tend to turn about such pivotal connection $d^2$ as the vehicle-body vibrates due to horse action, the springs acting to yieldingly limit the amount of this backward-and-forward movement of the seat and sustaining the same normally in its position for use.

While I have shown the springs F as being tension-springs disposed between the projecting ends of the spring-connecting devices E and the back and forward edges of the seat, it will be understood, of course, that the character of these springs and their disposition may be varied somewhat and that they may be compression rather than extension springs; but in any event it is desirable in my improved construction to pivotally connect the seat to the vehicle-body at a point considerably below the seat, so that while the vehicle-body may vibrate due to horse action the seat may remain normally stationary, or approximately so, and be controlled by the springs F, as hereinbefore described.

Having thus described my invention, what I claim, and desire to secure by Letters Patent, is—

1. In a vehicle of the character described, the combination of a seat having a single depending supporting-arm rigidly connected thereto at each end of the seat, said supporting-arm being provided with a series of perforations to adjust the height of seat, a pivot-bolt adapted to enter any of said perforations and support the seat, a bracket extended from either side of the depending seat-supporting arms and having downturned ends, and a spring directly connecting the downturned end of the brackets on each side of the depending supporting-arms with the seat.

2. In a vehicle, the combination of a seat, a depending supporting-arm fixedly secured to the seat, means for pivotally connecting the depending arm to the vehicle-body at a point below the seat to permit the latter to have a bodily-swinging movement in the arc of a circle about the pivotal connection of the depending arm with the vehicle-body due to vehicle motion, spring-connecting devices as brackets having downwardly-turned ends projecting to each side of the depending supporting-arm, and springs directly connecting the seat at each side of the depending supporting-arm with the downturned ends of said devices to control the bodily-swinging movement of the seat to either side of a vertical plane passed through the pivot of the depending supporting-arm.

3. In a vehicle of the character described, the combination of a seat, a depending supporting-arm at each end of the seat and rigidly secured thereto, the said supporting-arms at points remote from the seat having pivotal connection with the carriage-body to permit the seat as an entirety to swing in the arc of a circle about the pivotal connection of the supporting-arms within the carriage-body due to vehicle motion, spring-connecting devices as brackets having downwardly-turned ends provided with hooks and projecting to each side of the depending supporting-arms directly beneath the seat, and springs disposed on each side of the depending supporting-arms and connecting the hooked ends of the spring-connecting devices or brackets with the seat to control the bodily-swinging movement of the seat about the pivotal connection of the supporting-arms with the vehicle-body.

LOUIS B. TRUSLOW.

In presence of—
G. SMITH STANTON,
JOHN B. GILLIOT.